United States Patent
Yu et al.

(10) Patent No.: US 7,270,462 B2
(45) Date of Patent: Sep. 18, 2007

(54) REFLECTOR FOR FLAT PANEL DISPLAY DEVICE

(75) Inventors: Hong-Tien Yu, Bade (TW); Chung-Yung Li, Banchiau (TW)

(73) Assignee: Chungwa Picture Tubes, Ltd., Taipei (TW)

( * ) Notice: Subject to any disclaimer, the term of this patent is extended or adjusted under 35 U.S.C. 154(b) by 23 days.

(21) Appl. No.: 10/345,292

(22) Filed: Jan. 16, 2003

(65) Prior Publication Data

US 2003/0137825 A1    Jul. 24, 2003

(30) Foreign Application Priority Data

Jan. 18, 2002    (TW) ............... 91200447 U

(51) Int. Cl.
*F21V 7/04* (2006.01)
(52) U.S. Cl. ............ 362/609; 362/633; 362/634; 362/217; 362/221; 362/296; 349/58; 349/67; 349/70
(58) Field of Classification Search .......... 362/26, 362/217, 296, 221, 600, 602, 609, 614, 630, 362/632, 633, 634; 349/58, 67, 70
See application file for complete search history.

(56) References Cited

U.S. PATENT DOCUMENTS 2,259,915 A * 10/1941 Weritz .................. 439/242
3,331,958 A * 7/1967 Adler .................... 362/157
4,794,499 A * 12/1988 Ott ....................... 362/217
5,440,470 A * 8/1995 Ly ........................ 362/341
5,537,296 A * 7/1996 Kimura et al. ............ 362/31
5,632,547 A * 5/1997 Ge et al. ................. 362/16
5,727,868 A * 3/1998 Sharma .................. 362/147
6,295,105 B1 * 9/2001 Lee et al. ................. 349/65
2003/0007343 A1 * 1/2003 Ohwada et al. ........... 362/31
2003/0043569 A1 * 3/2003 Mori et al. ............... 362/31

* cited by examiner

*Primary Examiner*—Jong-Suk (James) Lee
*Assistant Examiner*—Jacob Y Choi
(74) *Attorney, Agent, or Firm*—Jianq Chyun IP Office

(57) ABSTRACT

A reflector for flat panel display device. The device is constructed having two sidewalls and a base wall defining with the sidewalls a receiving chamber having a substantially U-shaped cross section for holding a light source. The sidewalls and the base wall each have a reflecting surface adapted to reflect light from the light source installed in the reflector. The sidewalls each have a protruded flange (block) respectively disposed at an outer side for grounding with a grounding metal frame. The protruded flange (block) of each sidewall is not disposed with the respective sidewall on the same plane.

15 Claims, 2 Drawing Sheets

REFLECTOR FOR FLAT PANEL DISPLAY DEVICE

BACKGROUND OF THE INVENTION

1. Field of the Invention

The present invention relates to a reflector and, more particularly, to a reflector suitable for a flat panel display device device.

2. Description of Related Art

Recently, flat panel display device apparatus greatly attract consumers' attention for the advantage of lightweight and thin thickness. However, there are still many problems to be solved with respect to the display quality of flat panel display device. For example, how to maintain the electrical and the brightness stability of light source is one of these major issues. It is well known that during the operation of a conventional liquid crystal display device, the lighting of light source is frequently unstable. For some cases, these severe unstable lighting of the light source may cause a short circuit. This problem may result from the poor grounding between the reflector of the light source and the metal shell of the flat panel display device. If the reflector of the light source and the metal shell of the flat panel display device are not properly grounded, the reflector and the display module of the flat panel display device cannot form a grounding circuit, which results in and creates the formation of distributed capacitance in the structure. The distributed capacitance may further cause a leakage current as the metal shell of the flat panel display device is patted or impacted by an external force. This leakage current results in unstable supply of electricity to the light source. In addition, new distributed capacitance forms again when the reflector is separated from the metal shell of flat panel display device. The repeated formation of distributed capacitance deteriorates the stability of the light source, or even the whole system for displaying. Therefore, it is desirable to provide a reflector for flat panel display device that eliminates the aforesaid problems.

SUMMARY OF THE INVENTION

The present invention has been accomplished under the circumstances in view. It is the main object of the present invention is to provide a reflector or a backlight module for a flat panel display device, which greatly reduces the possibility of poor grounding, prevents the formation of the distributed capacitance between the light source and the metal shell of the reflector of the flat panel display device owing to multiple contacts between the reflector and the metal shell.

To acheive this and other of the present invention, the reflector for a flat panel display device, which is used with a light source flat panel display device, comprising: at lease two sidewalls and a base wall connected and sandwiched between said sidewalls; wherein said sidewalls and said base wall are intergrated to form a frame having a groove for holding and receiving said light source, said frame is in a shape of "U" or arc, at lease one inner surface of said sidewalls or said base wall of said groove of said frame is mounted or coated with reflective material layer to reflect light, at lease one conductive binding unit protruding from said outer surface of said sidewalls is mounted on one end of each sidewall.

The backlight module for a flat panel display device of the present invention, comprising: a light source; a light guide; and a reflector, said reflector comprising two sidewalls and a base wall connected and sandwiched between said sidewalls; wherein said sidewalls and said base wall are integrated to form a frame having a groove for holding and receiving said light source, said frame is in a shape of "U" or arc, at least one inner surface of said sidewalls or said base wall of said groove of said frame is mounted or coated with reflective material layer to reflect light, at least one conductive binding unit protruding from said outer surface of said sidewalls is mounted on one end of each sidewall.

Other objects, advantages, and novel features of the invention will become more apparent from the following detailed description when taken in conjunction with the accompanying drawings.

DETAILED DESCRIPTION OF THE PREFERRED EMBODIMENT

The location of the conductive binding unit of and the power cable of the light source can be arranged at any portion of the sidewalls. Preferably, the conductive binding unit of said sidewalls and the power cable of the light source installed in the reflector are mounted at the same end. The conductive binding units of said sidewalls can be any conventional and flexible conductive element. Preferably, the conductive binding units of said sidewalls are protruding electrically conductive blocks, electrically conductive bumps, electrically conductive pads, conductive rubber, conductive fabrics or a flange or a fin protruding from said surface of said sidewall, and said flange or said fin is connected with said sidewalls through at least one step. The length of said base wall or the length of the sidewalls is not limited. Preferably, the length of said base wall is shorter then that of said sidewall. The sidewalls having conductive binding unit can be processed through any conventional method. Preferably, conductive binding unit is respectively formed on said sidewalls by stamping. The reflector of the present invention can be used for any conventional flat panel display device. Preferably, the reflector of the present invention is used for a liquid crystal display device.

Figure 1:
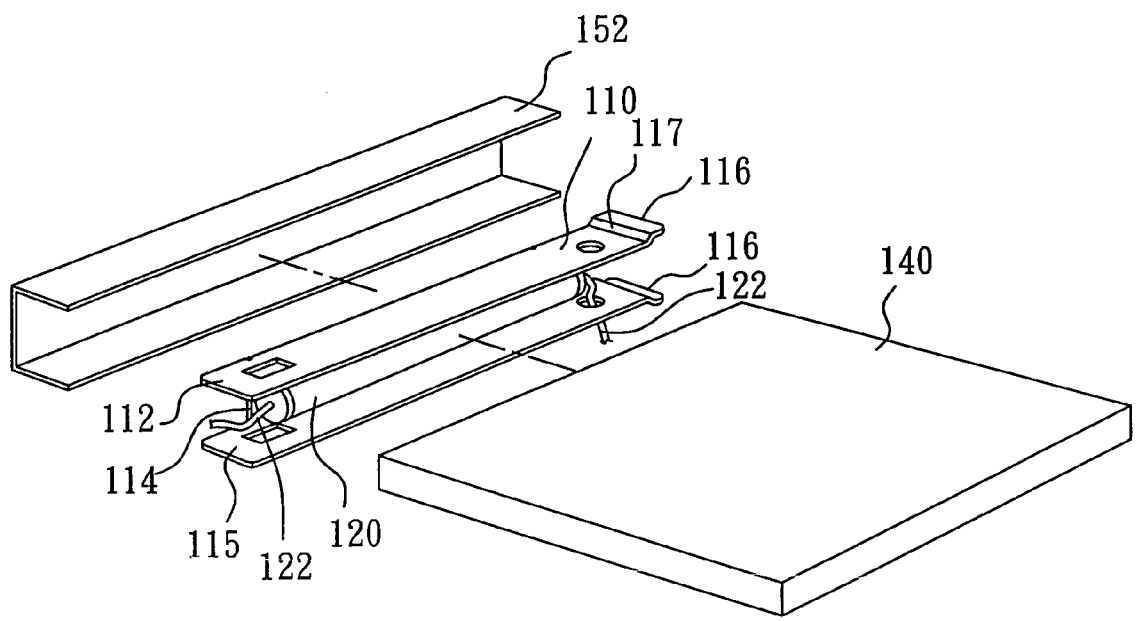
FIG. 1 is an exploded view of a reflector according to the present invention.
Figure 2:
FIG. 2 is a front view of the present invention, showing the one preferred embodiment of reflector of the present invention.

With reference to FIGS. 1 and 2, a reflector 110 is substantially a channel-like reflecting plate 110 (i.e. a reflector) having a U-shaped cross section and a groove for receiving a light source. The reflecting plate 110 comprises two sidewalls 112 and a base wall 114 connected and sandwiched between the sidewalls 112. The sidewalls 112 are arranged in parallel, and relatively longer than the base wall 114. Each sidewall 112 has one end terminating in a step 117 and a protruded flange 116 (i.e. a conductive binding unit). The step 117 and the protruded flange 116 are formed of a part of the respective sidewall 112 by stamping. Due to the effect of the step 117, the protruded flange 116 and the respective sidewall 112 are not maintained on the same plane. Therefore, the top and bottom sides of one end of the reflecting plate 110 are respectively outwardly protruded for positive contact with the inside wall of the grounding metal frame, referenced by 152, after installation of the light source (for example, lamp tube 120) in the reflecting plate 110, the protruded flanges 116 of the sidewalls 112 of the reflecting plate 110 are forced by the springy or elastic material property of the reflecting plate 110 into positive contact with the grounding metal frame 52. The sidewalls 112 and base wall 114 of the reflecting plate 110 have a reflecting surface 115 for reflecting light.

Referring to FIGS. 1 and 2 again, when the light source (e.g. cold cathode lamp tube) 120 installed in the reflecting plate 110, the grounding metal frame 152 is attached to the reflecting plate 110, and the power cord 122 of the light source 120 is connected to power source. Further, a light guide 140 is attached to the reflecting plate 110 for guiding light from the light source 120 to a predetermined location. When the light source 120 turned on, the reflecting surfaces 115 of the sidewalls 112 and base wall 114 of the reflecting plate 110 reflect light from the light source 120 to the light guide 140. Because the protruded flanges 116 of the sidewalls 112 of the reflecting plate 110 are forced by the springy material property of the reflecting plate 110 into positive contact with the grounding metal frame 52, the reflecting plate 110 and the grounding metal frame 150 are well grounded, preventing the light source 120 and the grounding metal frame 152 from producing distributed capacitance. Therefore, the invention effectively eliminates the formation of a short circuit due to poor grounding. In actual practice, the protruded flanges and the power cord of the light source are arranged at the same side to enhance grounding effect.

Figure 3A:
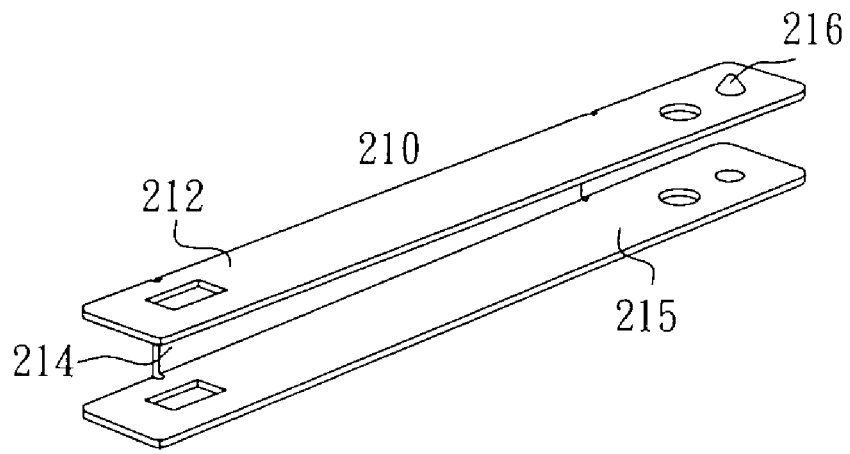
FIGS. 3A~3C show different alternate preferred embodiments of the reflector according to the present invention.

FIG. 3A shows an alternate form of the reflecting plate for the reflector according to the present invention. According to this embodiment, the reflecting plate 210 comprises two parallel sidewalls 212 and a base wall 210 connected between the sidewalls 210. The sidewalls 210 and base wall 214 each have a reflecting surface 215 at an inner side. Further, the sidewalls 212 each have a protruding block (or bump) 216 at an outer side for positive contact with the inside wall of the grounding metal frame. The protruded block (or bump) 216 is formed of a part of the respective sidewall 212 by stamping.

Figure 3B:
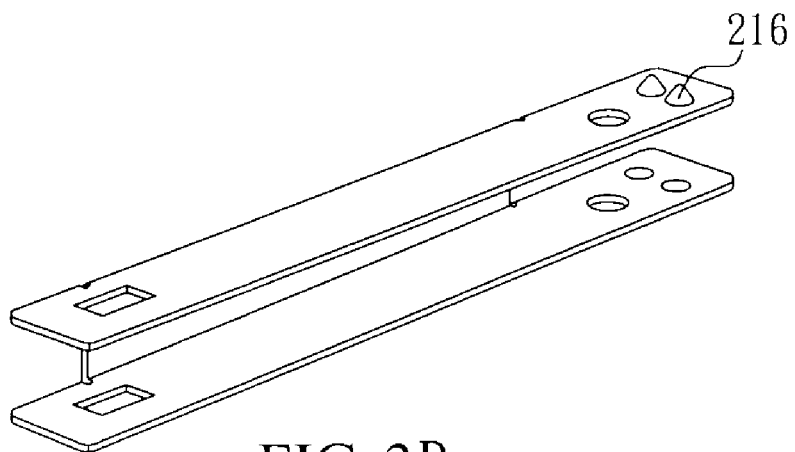

FIG. 3B shows another alternate form of the reflecting plate for the reflector according to the present invention. This embodiment is similar to the embodiment shown in FIG. 3A with the exception of the number of the protruded blocks 216 in the sidewalls of the reflecting plate.

Figure 3C:
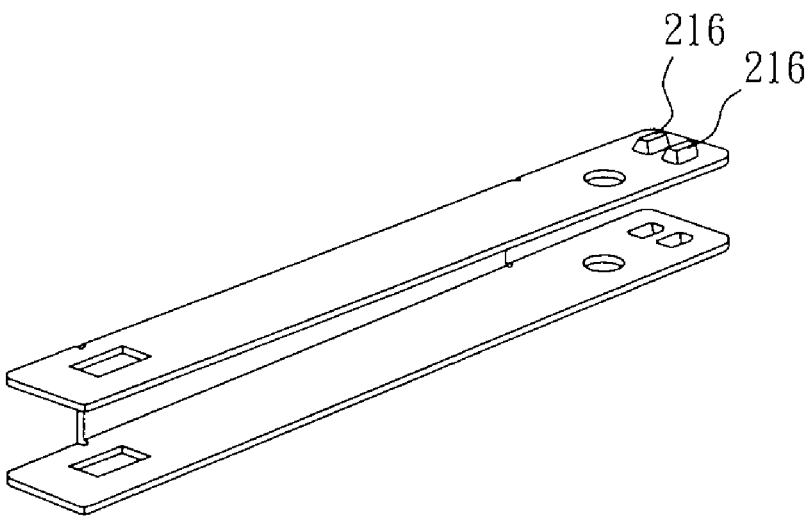

FIG. 3C shows still another alternate form of the reflecting plate for the reflector according to the present invention. This embodiment is similar to the embodiment shown in FIG. 3B with the exception of the shape of the protruded blocks 216 in the sidewalls of the reflecting plate.

A prototype of reflector for flat panel display device and a backlight module of a liquid crystal display panel has been constructed with the features of FIGS. 1~3. Since the reflecting plate illustrated above provides better electrical contact between the metal shell and the reflecting plate (or the reflector), the distributed capacity can be reduced effectively. The grounding between the metal shell and the reflecting plate (or the reflector) can be improved. Therefore, the stability of the electricity and the brightness of the light source can be improved as the interference from the distributed capacity is reduced. The reflector for flat panel display device functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A reflector for a flat panel display device, which is used with a light source of said flat panel display device, comprising:
   a reflecting plate, comprising at least two sidewalls and a base wall connected and sandwiched between said sidewalls, wherein the sidewalls and the base wall are integrated to form a frame in a U-shape or arc shape for holding and receiving said light source, and the inner surface of the frame is covered by reflective material layer to reflect light;
   at least one conductive binding unit, outwardly protruding from one end of each of the sidewalls; and
   a grounded frame in a U-shape or arc shape for holding and receiving the reflecting plate, wherein the conductive binding unit protruding from one end of each of the sidewall electrically contacts with the inner surface of the grounded frame.

2. The reflector as claimed in claim 1, wherein said conductive binding unit of said sidewalls and the power cable of said light source which is installed in the reflector are mounted at the same end.

3. The reflector as claimed in claim 1, wherein said conductive binding units of said sidewalls are protruding blocks or bumps.

4. The reflector as claimed in claim 1, wherein said conductive binding units of said sidewalls are electrically conductive pads; conductive rubber or conductive fabrics.

5. The reflector as claimed in claim 1, wherein said conductive binding unit of said sidewalls is conductive fins.

6. The reflector as claimed in claim 1, wherein said conductive binding unit of said sidewalls is a flange or a fin protruding from said outer surface of said sidewall, and said flange or said fin is connected with said sidewalls through at least one step.

7. The reflector as claimed in claim 1, wherein the length of said base wall is shorter than that of said sidewall.

8. The reflector as claimed in claim 1, wherein said conductive binding unit is formed on said sidewalls by stamping.

9. A backlight module for a flat panel display device, comprising:
   a light source;
   a reflecting plate, comprising at least two sidewalls and a base wall connected and sandwiched between said sidewalls, wherein the sidewalls and the base wall are integrated to form a frame in a U-shape or arc shape for holding and receiving said light source, and the inner surface of the frame is covered by reflective material layer to reflect light;

at least one conductive binding unit, outwardly protruding from one end of each of the sidewalls;

a grounded frame in a U-shape or arc shape for holding and receiving the reflecting plate, wherein the conductive binding unit protruding from one end of each of the sidewall electrically contacts with the inner surface of the grounded frame; and a light guide, attached to the reflecting plate for guiding light from the light source.

10. The backlight module as claimed in claim 9, wherein said conductive binding unit and the power cable of the light source installed in the reflector are mounted at the same end.

11. The backlight module as claimed in claim 9, wherein said conductive binding units are protruding blocks or bumps.

12. The backlight module as claimed in claim 9, wherein said conductive binding unit is flange or a fin protruded from said outer surface of side sidewall, and said flange or said fin is connected with said sidewalls through at least one step.

13. The backlight module as claimed in claim 9, wherein the length of said base wall is shorter than that of said sidewall.

14. The backlight module as claimed in claim 9, wherein said conductive binding unit is formed on said sidewalls by stamping.

15. The backlight module as claimed in claim 9, wherein said conductive binding unit are electrically conducting pads, conductive rubber or conductive fabrics.

* * * * *